US012705029B2

(12) United States Patent
Williams et al.

(10) Patent No.: US 12,705,029 B2
(45) Date of Patent: Aug. 11, 2026

(54) METHODS AND SYSTEMS OF SEQUENTIAL LATENT INFERENCE OF COMPLEX KNOWLEDGE

(71) Applicant: Kinaxis Inc., Ottawa (CA)

(72) Inventors: Phillip Williams, Ottawa (CA); Sebastien Ouellet, Ottawa (CA); Nathaniel Stanley, Ottawa (CA); Chantal Bisson-Krol, Ottawa (CA)

(73) Assignee: Kinaxis Inc., Ottawa (CA)

( * ) Notice: Subject to any disclaimer, the term of this patent is extended or adjusted under 35 U.S.C. 154(b) by 307 days.

(21) Appl. No.: 17/954,481

(22) Filed: Sep. 28, 2022

(65) Prior Publication Data

US 2023/0095571 A1 Mar. 30, 2023

Related U.S. Application Data

(60) Provisional application No. 63/249,631, filed on Sep. 29, 2021.

(51) Int. Cl.

*G06F 8/75* (2018.01)
*G06F 8/30* (2018.01)
*G06F 11/3604* (2025.01)
*G06F 11/362* (2025.01)
*G06Q 10/08* (2023.01)

(52) U.S. Cl.

CPC ................ *G06F 8/315* (2013.01); *G06F 8/75* (2013.01); *G06F 11/3612* (2013.01); *G06F 11/3636* (2013.01); *G06F 11/3644* (2013.01); *G06Q 10/08* (2013.01)

(58) Field of Classification Search

USPC ........................................................ 717/108
See application file for complete search history.

(56) References Cited

U.S. PATENT DOCUMENTS 9,703,676 B2 * 7/2017 Hay .................... G06F 11/3644
9,720,939 B1 8/2017 Andrews et al.
10,042,914 B2 8/2018 Huang et al.
10,275,502 B2 4/2019 Hubmann et al.
10,289,704 B1 5/2019 Andrews et al.
2006/0149503 A1 * 7/2006 Minor ..................... G06F 17/18 702/179
2008/0300851 A1 * 12/2008 Chakrabarti ............ G06F 8/433 703/22
2009/0254198 A1 * 10/2009 Lu .................... G06Q 10/06315 700/29
2013/0167129 A1 * 6/2013 Emani ....................... G06F 8/45 717/151
2014/0006321 A1 1/2014 Harik (Continued)

OTHER PUBLICATIONS

Chalasani, "Explainability in Neural Networks, Part 4: Path Methods for Feature Attribution" , Nov. 10, 2018 retrieved from <https://www.altacognita.com/path-methods/> on Aug. 10, 2024 (Year: 2018).*

(Continued)

*Primary Examiner* — Jason D Mitchell
(74) *Attorney, Agent, or Firm* — Ruggiero McAllister & McMahon LLC

(57) ABSTRACT

Methods and systems that allow for supply chain logic to be instrumented in such a way that a supply planner can see the major factors driving KPIs, as well as drill down to the lower level to see the impact of each item at the smallest possible level.

20 Claims, 7 Drawing Sheets

(56) References Cited

U.S. PATENT DOCUMENTS

| | | | | |
|---|---|---|---|---|
| 2019/0057131 | A1* | 2/2019 | Hassan | G06F 16/24542 |
| 2021/0110306 | A1* | 4/2021 | Krishnan | G06N 3/08 |
| 2022/0004839 | A1* | 1/2022 | Chen | G06N 3/088 |
| 2022/0222402 | A1* | 7/2022 | Okawachi | G06N 20/10 |
| 2022/0335348 | A1* | 10/2022 | Miller | G06N 3/088 |
| 2024/0005150 | A1* | 1/2024 | Dugger | G06N 3/08 |
| 2024/0083030 | A1* | 3/2024 | Chen | G05D 1/644 |

OTHER PUBLICATIONS

Grady et al. "Model Predictive Path Integral Control: From Theory to Parallel Computation", Feb. 2017, Jouranl of Guidance, Control, and Dynamics, vol. 40, issue 2, pp. 344-357 (Year: 2017).*

* cited by examiner

METHODS AND SYSTEMS OF SEQUENTIAL LATENT INFERENCE OF COMPLEX KNOWLEDGE

CROSS-REFERENCE TO RELATED APPLICATIONS

The present application claims the benefit of U.S. Patent Application No. 63/249,631, filed Sep. 29, 2021, and is expressly incorporated by reference in its entirety herein.

BACKGROUND

Supply chain management is an extremely complex field. Decades of research have gone into the development and implementation of analytics, optimizers, solvers and other key parts of digitizing and optimizing the supply chain. This complexity has provided great value to the field of supply chain management. However this complexity also means that it can be very difficult to isolate the cause of a specific issue or identify how a change contributes to the overall supply chain picture. Currently there is no way to know the direct impact of each element of the supply chain in a complex plan.

BRIEF SUMMARY

Disclosed herein are methods and systems related to data processing and data structures. Disclosed herein are methods and systems that allow for arbitrary supply chain logic to be instrumented in such a way that a supply planner can see the major factors driving Key Performance Indicators (KPIs), as well as drill down to the lower level to see the impact of each item at a very granular level. Systems and methods disclosed herein comprise an automatic differentiation engine and an analytical solver.

Instrumentation of software code can be defined as adding additional code to record information that is somewhat orthogonal to an original purpose of the software code. Instrumentation can allow for extraction of information for use in machine learning or other form of analysis.

The methods and systems disclosed herein use Automatic Differentiation and Numerical Integrals to provide transparency into analytics algorithms. Through the application of mathematics and programming tools/concepts, the analytics code is instrumented to produce white-box analysis and interpretability of previously-intractable complex supply chain logic.

Methods and systems disclosed herein can provide a new avenue of analysis of existing code. As such, the methods and systems disclosed herein do not add to optimization code, but instead, can provide new insights and novel analysis of current processes. As an example, systems and methods disclosed herein can identify bottlenecks in a supply chain, while executing existing code, instead of having a developer write additional logic to find and analyze a bottleneck once it has already occurred. The methods and systems disclosed herein allow for such an analysis concurrently with executing of existing code. Another example is identification of high risk areas of a supply chain. Methods and systems disclosed herein allow for concurrent analysis of the sensitivity of metrics and potential areas of disruption (for example, as in the case of a worldwide pandemic). In the absence of the methods and systems disclosed herein, a developer would have to write a separate code to specifically find and analyze such information. Instead, the methods and systems disclosed herein save run-time by concurrently capturing various interactions between variables during execution of existing code. With the methods and systems disclosed herein, there is no need to build separate, stand-along software to analyze particular issues.

In one aspect, a computer-implemented method includes instrumenting, by an auto-differentiation engine, a codebase; capturing, by the auto-differentiation engine, interactions between one or more variables in the codebase during execution of the codebase; executing, by a processor, the codebase, thereby generating a metric, extracting, by the processor, low-level data from the codebase; and determining, by the processor, an impact of each of the one or more variables on the metric.

In some embodiments of the computer-implemented method, the codebase is a C++ codebase. In some embodiments of the computer-implemented method, the low-level data comprises data structures, lists of executed mathematical operations, and at least one of derivatives-related data, calculus-related data, and optimization-related data. In some embodiments of the computer-implemented method, the codebase is related to supply chain management, one or more extensions are made to the auto-differentiation engine, and hooks are added to one or more points in the codebase. In some embodiments of the computer-implemented method, the low-level data includes a directed acyclic graph. In some embodiments of the computer-implemented method, path-integrated gradients are used to compute the impact based on the directed acyclic graph. Other technical features may be readily apparent to one skilled in the art from the following figures, descriptions, and claims.

In one aspect, a system includes a processor. The system also includes a memory storing instructions that, when executed by the processor, configure the system to instrument, by an auto-differentiation engine, a codebase, capture, by the auto-differentiation engine, interactions between one or more variables in the codebase during execution of the codebase, execute, by the processor, the codebase, thereby generating a metric, extract, by the processor, low-level data from the codebase, and determine, by the processor, an impact of each of the one or more variables on the metric.

In some embodiments of the system, the codebase is a C++ codebase. In some embodiments of the system, the low-level data comprises data structures, lists of executed mathematical operations, and at least one of derivatives-related data, calculus-related data, and optimization-related data. In some embodiments of the system, the codebase is related to supply chain management, one or more extensions are made to the auto-differentiation engine, and hooks are added to one or more points in the codebase. In some embodiments of the system, the low-level data includes a directed acyclic graph. In some embodiments of the system, path-integrated gradients are used to compute the impact based on the directed acyclic graph. Other technical features may be readily apparent to one skilled in the art from the following figures, descriptions, and claims.

In one aspect, a non-transitory computer-readable storage medium is provided, the computer-readable storage medium including instructions that when executed by a computer, cause the computer to: instrument, by an auto-differentiation engine, a codebase; capture, by the auto-differentiation engine, interactions between one or more variables in the codebase during execution of the codebase; execute, by a processor, the codebase, thereby generating a metric; extract, by the processor, low-level data from the codebase; and determine, by the processor, an impact of each of the one or more variables on the metric.

In some embodiments of the non-transitory computer-readable storage medium, the codebase is a C++ codebase. In some embodiments of the non-transitory computer-readable storage medium, the low-level data comprises data structures, lists of executed mathematical operations, and at least one of derivatives-related data, calculus-related data, and optimization-related data. In some embodiments of the non-transitory computer-readable storage medium, the codebase is related to supply chain management, one or more extensions are made to the auto-differentiation engine, and hooks are added to one or more points in the codebase. In some embodiments of the non-transitory computer-readable storage medium, the low-level data includes a directed acyclic graph. In some embodiments of the non-transitory computer-readable storage medium, path-integrated gradients are used to compute the impact based on the directed acyclic graph. Other technical features may be readily apparent to one skilled in the art from the following figures, descriptions, and claims.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE SEVERAL VIEWS OF THE DRAWINGS

To easily identify the discussion of any particular element or act, the most significant digit or digits in a reference number refer to the figure number in which that element is first introduced. Like reference numbers and designations in the various drawings indicate like elements.

The description of elements in each figure may refer to elements of proceeding figures. Like numbers refer to like elements in all figures, including alternate embodiments of like elements.

DETAILED DESCRIPTION

Figure 1:
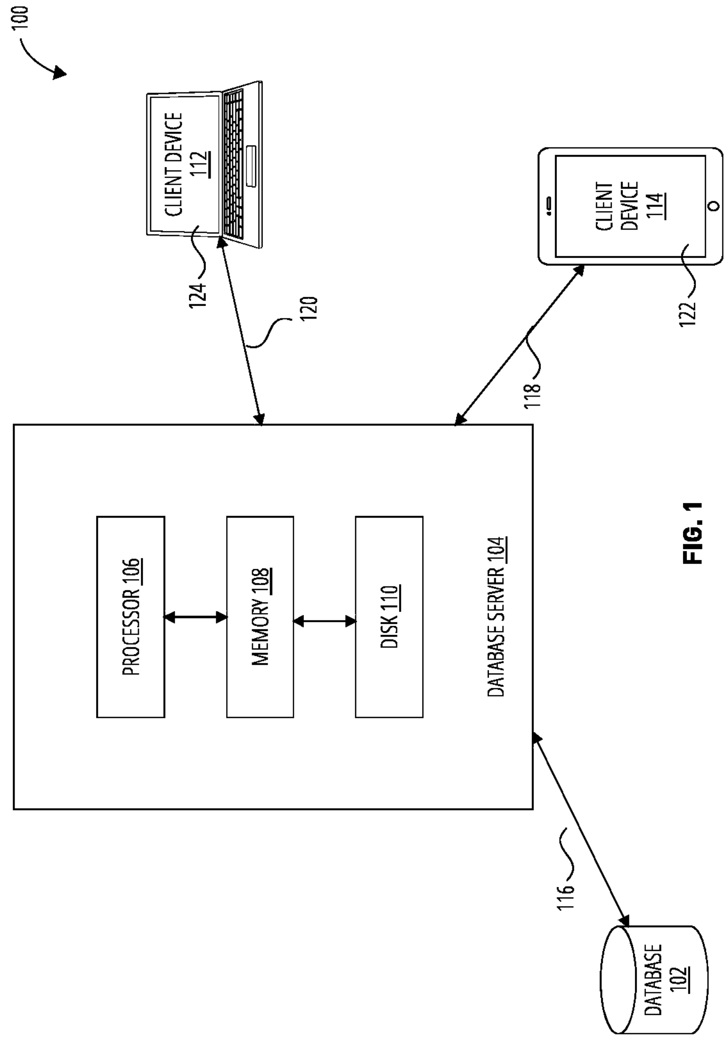
FIG. 1 illustrates an example of a system for sequential latent inference of complex knowledge in accordance with one embodiment.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a Blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Python, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

A computer program (which may also be referred to or described as a software application, code, a program, a script, software, a module or a software module) can be written in any form of programming language. This includes compiled or interpreted languages, or declarative or procedural languages. A computer program can be deployed in many forms, including as a module, a subroutine, a stand-alone program, a component, or other unit suitable for use in a computing environment. A computer program can be deployed to be executed on one computer or can be deployed on multiple computers that are located at one site or distributed across multiple sites and interconnected by a communication network.

As used herein, a "software engine" or an "engine," refers to a software implemented system that provides an output that is different from the input. An engine can be an encoded block of functionality, such as a platform, a library, an object or a software development kit ("SDK"). Each engine can be implemented on any type of computing device that includes one or more processors and computer readable media. Furthermore, two or more of the engines may be implemented on the same computing device, or on different computing devices. Non-limiting examples of a computing device include tablet computers, servers, laptop or desktop computers, music players, mobile phones, e-book readers, notebook computers, PDAs, smart phones, or other stationary or portable devices.

The processes and logic flows described herein can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit). For example, the processes and logic flows that can be performed by an apparatus, can also be implemented as a graphics processing unit (GPU).

Computers suitable for the execution of a computer program include, by way of example, general or special purpose microprocessors or both, or any other kind of central processing unit. Generally, a central processing unit receives instructions and data from a read-only memory or a random access memory or both. A computer can also include, or be operatively coupled to receive data from, or transfer data to, or both, one or more mass storage devices for storing data, e.g., optical disks, magnetic, or magneto optical disks. It should be noted that a computer does not require these devices. Furthermore, a computer can be embedded in another device. Non-limiting examples of the latter include a game console, a mobile telephone a mobile audio player, a personal digital assistant (PDA), a video player, a Global Positioning System (GPS) receiver, or a portable storage device. A non-limiting example of a storage device include a universal serial bus (USB) flash drive.

Computer readable media suitable for storing computer program instructions and data include all forms of non-volatile memory, media and memory devices; non-limiting examples include magneto optical disks; semiconductor memory devices (e.g., EPROM, EEPROM, and flash memory devices); CD ROM disks; magnetic disks (e.g., internal hard disks or removable disks); and DVD-ROM disks. The processor and the memory can be supplemented by, or incorporated in, special purpose logic circuitry.

To provide for interaction with a user, embodiments of the subject matter described herein can be implemented on a computer having a display device for displaying information to the user and input devices by which the user can provide input to the computer (for example, a keyboard, a pointing device such as a mouse or a trackball, etc.). Other kinds of devices can be used to provide for interaction with a user. Feedback provided to the user can include sensory feedback (e.g., visual feedback, auditory feedback, or tactile feedback). Input from the user can be received in any form, including acoustic, speech, or tactile input. Furthermore, there can be interaction between a user and a computer by way of exchange of documents between the computer and a device used by the user. As an example, a computer can send web pages to a web browser on a user's client device in response to requests received from the web browser.

Embodiments of the subject matter described in this specification can be implemented in a computing system that includes: a front end component (e.g., a client computer having a graphical user interface or a Web browser through which a user can interact with an implementation of the subject matter described herein); or a middleware component (e.g., an application server); or a back end component (e.g. a data server); or any combination of one or more such back end, middleware, or front end components. The components of the system can be interconnected by any form or medium of digital data communication, e.g., a communication network. Non-limiting examples of communication networks include a local area network ("LAN") and a wide area network ("WAN").

The computing system can include clients and servers. A client and server are generally remote from each other and typically interact through a communication network. The relationship of client and server arises by virtue of computer programs running on the respective computers and having a client-server relationship to each other.

FIG. 1 illustrates an example of a system 100 for sequential latent inference of complex knowledge in accordance with one embodiment.

System 100 includes a database server 104, a database 102, and client devices 112 and 114. Database server 104 can include a memory 108, a disk 110, and one or more processors 106. In some embodiments, memory 108 can be volatile memory, compared with disk 110, which can be non-volatile memory. In some embodiments, database server 104 can communicate with database 102 using interface 116. Database 102 can be a versioned database or a database that does not support versioning. While database 102 is illustrated as separate from database server 104, database 102 can also be integrated into database server 104, either as a separate component within database server 104, or as part of at least one of memory 108 and disk 110. A versioned database can refer to a database which provides numerous complete delta-based copies of an entire database. Each complete database copy represents a version. Versioned databases can be used for numerous purposes, including simulation and collaborative decision-making.

System 100 can also include additional features and/or functionality. For example, system 100 can also include additional storage (removable and/or non-removable) including, but not limited to, magnetic or optical disks or tape. Such additional storage is illustrated in FIG. 1 by memory 108 and disk 110. Storage media can include volatile and nonvolatile, removable and non-removable media implemented in any method or technology for storage of information such as computer-readable instructions, data structures, program modules or other data. Memory 108 and disk 110 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 100. Any such non-transitory computer-readable storage media can be part of system 100.

System 100 can also include interfaces 116, 118 and 120. Interfaces 116, 118 and 120 can allow components of system 100 to communicate with each other and with other devices. For example, database server 104 can communicate with database 102 using interface 116. Database server 104 can also communicate with client devices 112 and 114 via interfaces 120 and 118, respectively. Client devices 112 and 114 can be different types of client devices; for example, client device 112 can be a desktop or laptop, whereas client device 114 can be a mobile device such as a smartphone or tablet with a smaller display. Non-limiting example interfaces 116, 118 and 120 can include wired communication links such as a wired network or direct-wired connection, and wireless communication links such as cellular, radio frequency (RF), infrared and/or other wireless communication links. Interfaces 116, 118 and 120 can allow database server 104 to communicate with client devices 112 and 114 over various network types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). The various network types to which interfaces 116, 118 and 120 can connect can run a plurality of network protocols including, but not limited to Transmission Control Protocol (TCP), Internet Protocol (IP), real-time transport protocol (RTP), realtime transport control protocol (RTCP), file transfer protocol (FTP), and hypertext transfer protocol (HTTP).

Using interface 116, database server 104 can retrieve data from database 102. The retrieved data can be saved in disk 110 or memory 108. In some cases, database server 104 can also comprise a web server, and can format resources into a format suitable to be displayed on a web browser. Database server 104 can then send requested data to client devices 112 and 114 via interfaces 120 and 118, respectively, to be displayed on applications 122 and 124. Applications 122 and 124 can be a web browser or other application running on client devices 112 and 114.

Figure 2:
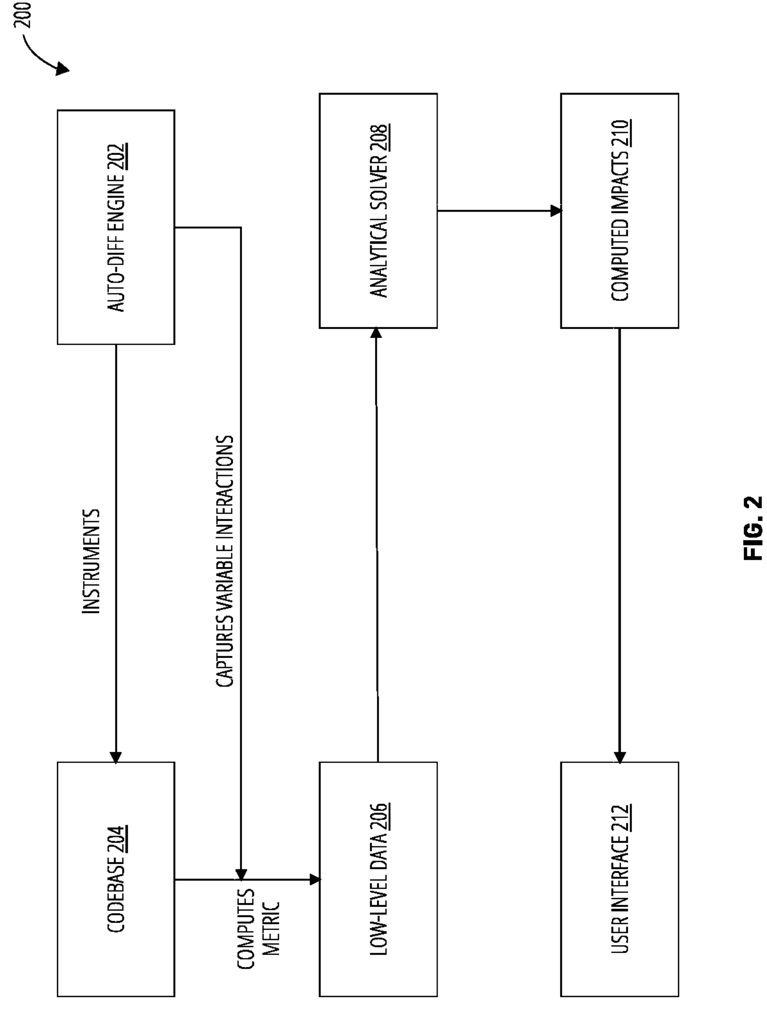
FIG. 2 illustrates block diagram in accordance with one embodiment.

FIG. 2 illustrates block diagram 200 in accordance with one embodiment.

Automatic differentiation (auto-diff) is an advanced technique with deep ties to machine learning. The auto-diff engine 202 allows for instrumentation of codebase 204 so that a variable can be tracked anywhere it is used in software. From the perspective of a human, the challenge is that codebase 204 is massive and it is, for all practical purposes, an impossible task to go into codebase 204 and extract, by hand, the type of mathematical data needed for a multivariable analysis. On the other hand, auto-diff engine 202 allows for addition of an extra tier of code that allows for extraction of those relationships and analysis thereof. Auto-diff engine 202 provides tools for specifying what is relevant to the problem and then extracting all relevant interactions. Once a user specifies one or more inputs to track as the code is captured, auto-diff engine 202 shows how different inputs and variables interact with each other.

Additionally, automatic differentiation can "infect" other variables. For example, if a variable "A" is instrumented with the auto-diff engine 202, and then an operation is applied on A and another variable "B" at the same time, the B variable will be added to the auto-diff engine 202 as well. This allows the software to automatically determine the entire dependency of all variables in a workflow. The auto-diff engine 202 allows for monitoring how each packet of information flows through an entire logic flow, as well as for tracking what impacts that variable has on other variables that it directly influences.

Upon execution, codebase 204 computes metrics. In some embodiments, codebase 204 is a C++ code. However, integration of auto-diff engine 202 allows, as an additional output, further visibility into the inner workings of codebase 204, since auto-diff engine 202 captures variable interactions. On its own (that is, without auto-diff engine 202), execution of codebase 204 only provides metrics.

The auto-diff engine 202 allows for extraction of detailed and low-level information 206 from codebase 204. The metrics computed by codebase 204 provide a high level view of codebase 204. However, auto-diff engine 202 provides granular or low-level data 206 in dense machine format. These can comprise data structures, such as a matrix of values that indicate the strength of interactions between these variables (the matrix or matrices can be very large in dimension); lists of mathematical operations that were executed; derivatives or calculus or optimization related-data. Low-level data 206 is very dense data of all of the minute interactions between variables; such interactions may number in the hundreds of thousands, or millions.

However, the volume of low-level data 206 can be so large that it can be impossible to extract any meaningful information. This problem is addressed by the addition of an analytical solver 208 which receives the voluminous amount of low-level data 206 and extracts meaningful signals from noise. Analytical solver 208 allows a user to drill down and focus or solve relationships that are relevant to the user.

The analytical solver 208 can use a mathematical techniques based on Path Integrated Gradients to evaluate how each of the individual changes in the entire flow affect the final output, which is output as computed impacts 210.

Once all of the impacts have been computed, the resulting impact information can be presented to a user via user interface 212, starting at a root metric, and subsequently allowing the user to drill down one level at a time in order to see the most important impacts at any given level of detail. This can enable users to see which factors influence a particular metric, while simultaneously enabling users to drill down to the most granular level and identify problems at the highest level of detail possible.

Figure 3:
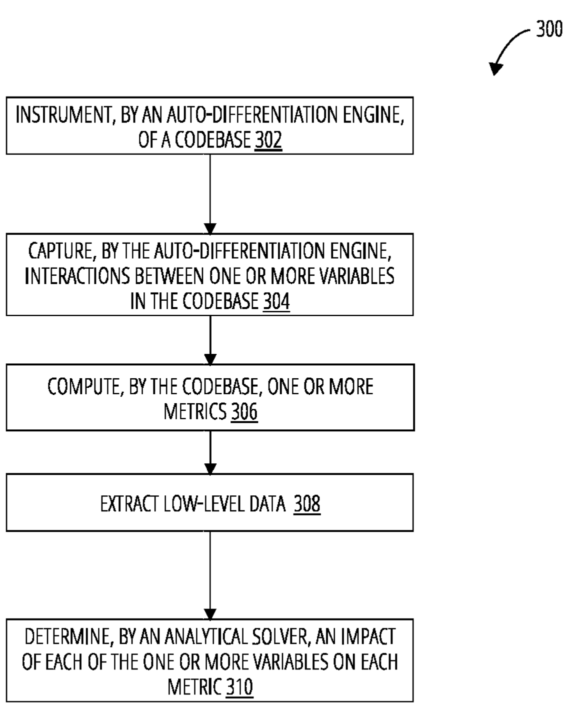
FIG. 3 illustrates a flowchart in accordance with one embodiment.

FIG. 3 illustrates a block diagram 300 in accordance with one embodiment. At block 302, an auto-differentiation engine instruments a codebase. In some embodiments, the codebase is a C++ code. A result of such instrumentation is the capture, by the auto-differentiation engine, of interactions between one or more variables in the codebase. Blocks 302 and 304 occur while the codebase is being executed. At block 306, execution of the codebase produces one or more metrics. At block 308, low-level data resulting from the instrumentation by the auto-differentiation engine, is produced. The low-level data is further analyzed at block 310 by an analytical solver to provide an impact of each of the one or more variables on each metric (produced at block 306).

Figure 4:
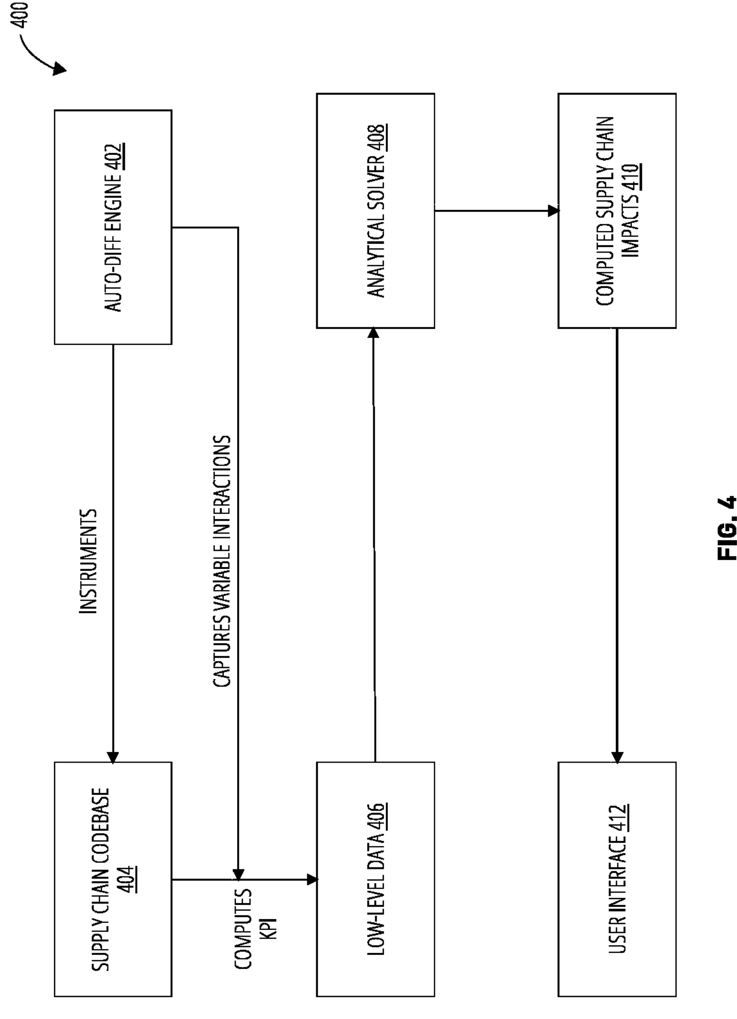
FIG. 4 illustrates block diagram in accordance with one embodiment.

FIG. 4 illustrates block diagram 400 in accordance with one embodiment.

Automatic differentiation (auto-diff) is an advanced technique with deep ties to machine learning. The auto-diff engine 402 allows for instrumentation of supply chain codebase 404 so that a variable can be tracked anywhere it is used in software. From the perspective of a human, the challenge is that supply chain codebase 404 is massive and it is, for all practical purposes, an impossible task to go into supply chain codebase 404 and extract, by hand, the type of mathematical data needed for a multivariable analysis. On the other hand, auto-diff engine 402 allows for addition of an extra tier of code that allows for extraction of those relationships and analysis thereof. Auto-diff engine 402 provides tools for specifying what is relevant to the problem and then extracting all relevant interactions. Once a user specifies one or more inputs to track as the code is captured, auto-diff engine 402 shows how different inputs and variables interact with each other.

Additionally, automatic differentiation can "infect" other variables. For example, if a variable "A" is instrumented with the auto-diff engine 402, and then an operation is applied on A and another variable "B" at the same time, the B variable will be added to the auto-diff engine 402 as well. This allows the software to automatically determine the entire dependency of all variables in a workflow. The auto-diff engine 402 allows for monitoring how each packet of information flows through an entire logic flow, as well as for tracking what impacts that variable has on other variables that it directly influences.

Upon execution, supply chain codebase 404 computes KPIs. In some embodiments, supply chain codebase 404 is a C++ code. However, integration of auto-diff engine 402 allows, as an additional output, further visibility into the inner workings of supply chain codebase 404, since auto-diff engine 402 captures variable interactions. On its own (that is, without auto-diff engine 402), execution of supply chain codebase 404 only provides KPIs.

The auto-diff engine 402 allows for extraction of detailed and low-level information low-level data 406 from supply chain codebase 404. The KPIs computed by supply chain codebase 404 provide a high level view of supply chain codebase 404. However, auto-diff engine 202 provides granular or low-level data 406 in dense machine format. These can comprise data structures, such as a matrix of values that indicate the strength of interactions between these variables (the matrix or matrices can be very large in dimension); lists of mathematical operations that were executed; derivatives or calculus or optimization related-data. Low-level data 206 is very dense data of all of the minute interactions between variables; such interactions may number in the hundreds of thousands or millions.

However, the volume of low-level data 406 can be so large that it can be impossible to extract any meaningful information. This problem is addressed by the addition of an analytical solver 408 which receives the voluminous amount of low-level data 406 and extracts meaningful one or more meaningful signals from noise. Analytical solver 408 allows a user to drill down and focus or solve relationships that are relevant to the user.

The analytical solver 408 can use a mathematical techniques based on Path Integrated Gradients to evaluate how each of the individual changes in the entire flow affect the final output, which is output as computed supply chain impacts 410.

Once all of the impacts have been computed, the resulting impact information can be presented to a user via user interface 412, starting at a root KPI, and subsequently allowing the user to drill down one level at a time in order to see the most important impacts at any given level of detail. This can enable users to see which factors influence a particular KPI, while simultaneously enabling users to drill down to the most granular level and identify problems at the highest level of detail possible.

While auto-diff engines in general provide a toolbox to analyze most basic kinds of relationships within a codebase, the complexity of supply chain codebase 404 makes it challenging to apply an auto-diff engine 'as is'. Straight or direct application of a standard auto-differentiation engine to supply chain codebase 404 often results in failure. Instead, extensions can be made to an auto-differentiation engine in order for it to be successfully applied to supply chain codebase 404. As such, auto-diff engine 402 is a customized version specifically applicable to supply chain codebase 404.

Figure 5:
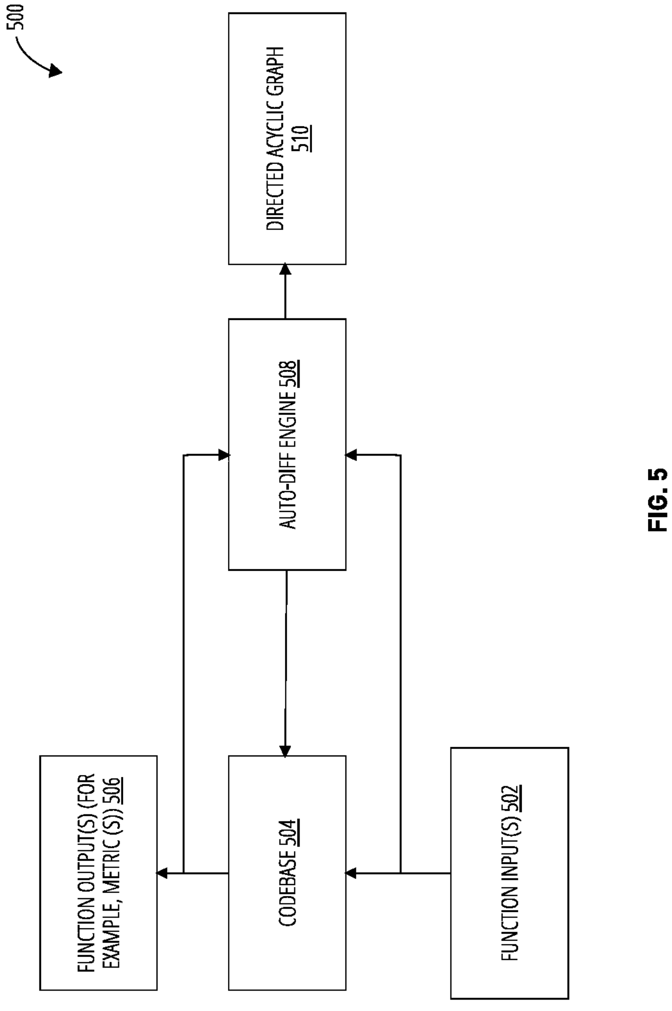
FIG. 5 illustrates generation of a directed acyclic graph in accordance with one embodiment.

FIG. 5 illustrates generation of a directed acyclic graph 500 in accordance with one embodiment. FIG. 5 illustrates a process of instrumentation of codebase 504, where codebase 504 computes one or more metrics. Output of the instrumentation is low-level data, which in the embodiment shown in FIG. 5, is in the form of a Directed Acyclic Graph (DAG) 510.

Through the use of an auto-diff engine 508, it is possible to record all of the variables and their respective interactions and operations throughout execution of codebase 504. This information is recorded in the form of a DAG at block 510. Once the DAG 510 has been extracted for a given execution of an algorithm, mathematical analysis can be performed on the DAG 510 by an analytical solver (not shown) to extract the impact of any given element of the DAG 510 on the final output(s).

The auto-diff engines 508 can be used to intercept the input(s) 502 and/or the output(s) 506 of a given flow. From that, the auto-diff engine 508 can keep track of all the variables and operations used as well as the interactions and extract the information as a DAG 510. In the embodiment shown in FIG. 5, a codebase 504 receives function input(s) at block 502, and generates function output(s) (for example, one or more metrics) at block 506. In some embodiments, codebase 504 is a C++ code.

In some embodiments, hooks are added to different points in the codebase 504 in order to measure interaction between variables. Auto-diff engine 508 can take values at these different hook points in order to provide a measure of the interactions. Such a process is an example of instrumentation by auto-diff engine 508 of codebase 504.

Figure 6:
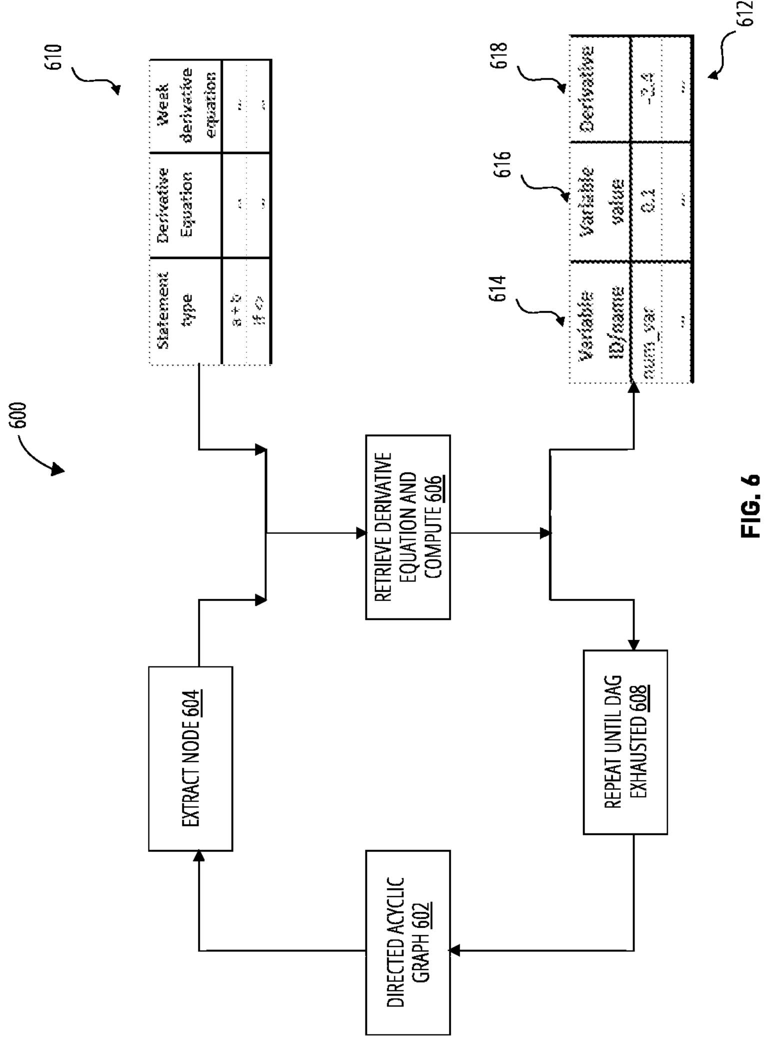
FIG. 6 illustrates determination of impacts in accordance with one embodiment.

FIG. 6 illustrates determination of impacts 600 in accordance with one embodiment. In relation to FIG. 2, FIG. 6 illustrates an example applying an analytical solver 208 to low-level data 206. In the embodiment shown in FIG. 6, an analytical solver is applied to a DAG (an example of low-level data 206), which can describe all of the interactions between variables, along with other numerical data.

The impact of various variables and operations in the DAG 602 can be computed by the process shown in FIG. 6. Application of an analytical solver first comprises an extraction of a DAG node at block 604 and computation of the rate of change of the output(s) relative to all of the inputs and intermediate values. That is, this step comprises computation of a derivative. However not every mathematical operation that can be implemented in software has a defined derivative; in such cases, the concept of calculating a rate of change is extended by using a "weak derivative", which is a machine operation, not a mathematical operation. Since the analysis is mechanical, rather than mathematical, rules can be specified for processing certain mathematical statements. This step can comprise the use of a look-up table/dictionary 610 of basic operations that are supported, along with their derivative/weak derivatives. In some embodiments, this table/dictionary can be an exhaustive set of rules, or a relatively small list, to cover most, if not all, use cases. While two statement types are shown in table/dictionary 610, there can be fewer or more.

Additionally, the derivative is usually defined for certain classes of operations. However, in the case of a supply chain code, operations are often used that are outside a set of defined derivatives. In such cases, a "weak-derivative" can be used, which is similar to, but distinct from, the defined derivatives, and offers fewer mathematical guarantees, but is more generally applicable.

The derivative equation is retrieved at block 606, and the output is provided at table 612. At table 612, each variable listed in column 614, has an associated value (column 616) and derivative (column 618). In the embodiment shown in table 612, the variable "num var" has a value of 0.1 and a derivative of −2.4. The derivative is the rate of change of a function relative to a given input. If the derivative is positive, this means that a larger input will lead to a larger output (numerically). If the derivative is negative, that means that a larger input will lead to a smaller output (numerically).

Subsequent steps comprises traversing the DAG (608) and computing the derivatives as needed.

Figure 7:
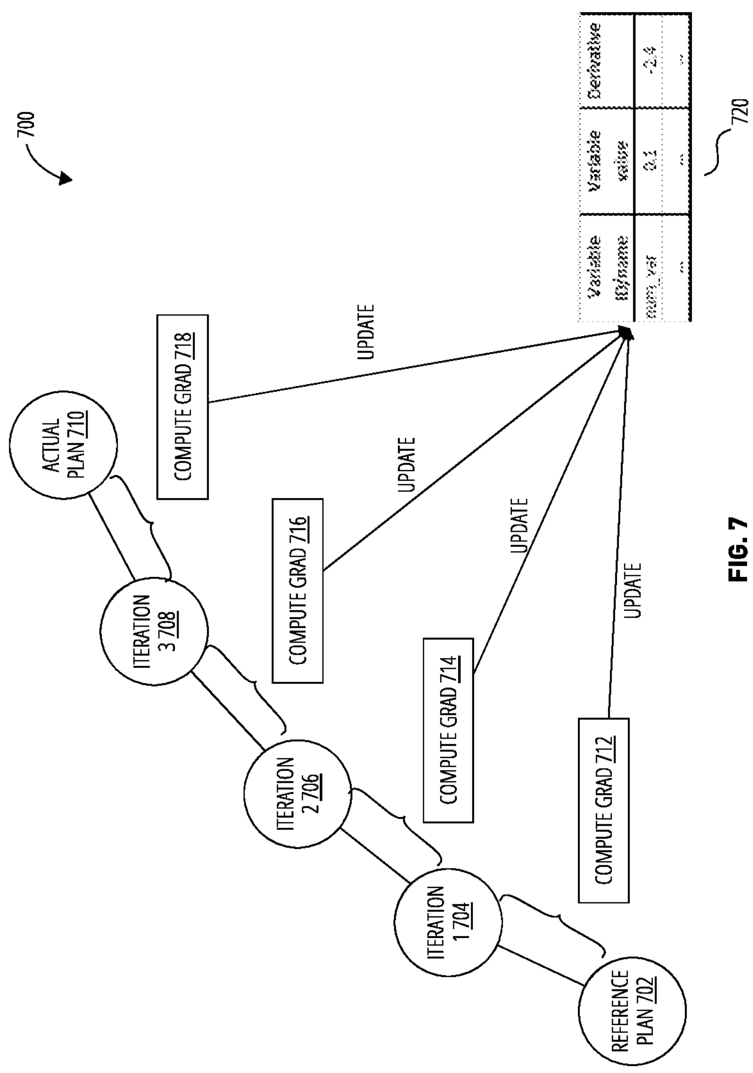
FIG. 7 illustrates determination of impacts in accordance with one embodiment.

FIG. 7 illustrates determination of impacts from derivative information extracted from the DAG using the auto-diff engine, in accordance with one embodiment. More specifically, FIG. 7 is a more detailed view 700 of block 208 (in FIG. 2), block 408 (FIG. 4) and block 310 of block diagram 300.

The final step comprises computing the impacts from the derivative information extracted from the DAG using the auto-diff engine. In some embodiments, the technique used comprises path-integrated gradients. The process starts at a known reference plan 702, which is a starting point that can serve as a gauge/baseline from which the effects of different changes can be computed and compared. The process iteratively updates the reference plan 702 to get closer and closer to the (final) actual plan 710 that is to be analyzed. At each of these iteration steps, all of the auto-diff steps are performed, and the table 720 is updated at each iteration. After the final step, the table 720 will have converged to it's actual (final) values. The analysis can include measuring how metrics vary has input parameters are varied. As an example, where supply chain code is used, the analysis can include measuring differences in the plan KPI as the input parameters are varied.

At each iteration point (for example, iteration 1 704, iteration 2 706 and iteration 3 708) between the reference plan 702 and the actual plan 710, the derivative (or gradient, at steps 712, 714, 716 and 718) of all of the values is computed, followed by computation of their cumulative/overall effect via numerical integration according to a path-integrated gradients scheme. With reference to FIG. 3, steps 712, 714, 716 and 718 are repeated executions of block 308 (extraction of low-level data). In the end, a hierarchy of all the variables/intermediate values from the DAG is produced, and the cumulative impact of each of those values using path-integrated gradients. The results can then be visualized in a tree diagram.

More specifically, throughout the iteration, the analysis algorithm and the auto-diff engine make modifications to the reference plan 702, in small increments until reaching a final state (actual plan 710) that a user wishes to analyze. The process records and analyses all the minute differences that the changes cause at each iteration, and from that information, computes the effect of the changes on the final metrics. At each iteration, many variables are slightly modified. Then the derivative of each intermediate value is recorded by the auto-diff engine. The analysis engine then extracts the relationships from that data across the many iterations steps.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
instrumenting, by an auto-differentiation engine, a codebase;
capturing during execution of the codebase, by the auto-differentiation engine, interactions of a plurality of variables in the codebase;
executing, by a processor, the codebase, thereby generating a metric;
extracting, by the processor, low-level data from the codebase, wherein the low-level data comprises dense data of the interactions of the plurality of variables; and
determining, by the processor, an impact of each of the plurality of variables on the metric, wherein the impact for each of the plurality of variables indicates how iterative changes to that one of the plurality of variables affects the metric so that the processor can compute the incremental differences in the iterative changes at each iteration and the effect of the iterative changes on a final state of the metric.

2. The computer-implemented method of claim 1, wherein the codebase is a C++ codebase.

3. The computer-implemented method of claim 1, wherein the codebase is related to supply chain management, one or more extensions are made to the auto-differentiation engine, and hooks are added to one or more points in the codebase.

4. The computer-implemented method of claim 1, wherein the low-level data comprises data structures, lists of executed mathematical operations, and at least one of derivatives-related data, calculus-related data, and optimization-related data.

5. The computer-implemented method of claim 1, wherein the low-level data comprises a directed acyclic graph.

6. The computer-implemented method of claim 5, wherein path-integrated gradients are used to compute the impact based on the directed acyclic graph.

7. The computer-implemented method of claim 1, wherein the interactions of the plurality variables in the codebase include how the plurality of the variables interact with each other, and the method further includes:
determining by the processor, how one or more of the plurality of variables impacts another one or more of the plurality of variables.

8. The method of claim 7, wherein the method further comprises: automatically determining an entire dependency of all the plurality of variables in a workflow based on the interactions of the plurality of variables captured during the instrumentation of the codebase.

9. A system comprising:

a processor; and a memory storing instructions that, when executed by the processor, configure the system to:

instrument, by an auto-differentiation engine, a codebase;

capture during execution of the codebase, by the auto-differentiation engine, interactions a plurality of variables in the codebase;

execute, by the processor, the codebase, thereby generating a metric;

extract, by the processor, low-level data from the codebase, wherein the low-level data comprises dense data of the interactions of the plurality of variables; and determine, by the processor, an impact of each of the plurality variables on the metric, wherein the impact for each of the one or more variables indicates how iterative changes to that one of the plurality of variables affects the metric so that the processor can compute the incremental differences in the iterative changes at each iteration and the effect of the iterative changes on a final state of the metric.

10. The system of claim 9, wherein the codebase is a C++ codebase.

11. The system of claim 9, wherein the low-level data comprises data structures, lists of executed mathematical operations, and at least one of derivatives-related data, calculus-related data, and optimization-related data.

12. The system of claim 9, wherein the codebase is related to supply chain management, one or more extensions are made to the auto-differentiation engine, and hooks are added to one or more points in the codebase.

13. The system of claim 9, wherein the low-level data comprises a directed acyclic graph.

14. The system of claim 13, wherein path-integrated gradients are used to compute the impact based on the directed acyclic graph.

15. A non-transitory computer-readable storage medium, the computer-readable storage medium including instructions that when executed by a computer, cause the computer to:

instrument, by an auto-differentiation engine, a codebase;

capture during execution of the codebase, by the auto-differentiation engine, interactions of a plurality of variables in the codebase;

execute, by a processor, the codebase, thereby generating a metric;

extract, by the processor, low-level data from the codebase, wherein the low-level data comprises dense data of the interactions of the plurality of variables;

determine, by the processor, an impact of each of the plurality variables on the metric, wherein the impact for each of the plurality of variables indicates how iterative changes to that one of the plurality of variables affects the metric so that the processor can compute the incremental differences in the iterative changes at each iteration and the effect of the iterative changes on a final state of the metric.

16. The computer-readable storage medium of claim 15, wherein the codebase is a C++ codebase.

17. The computer-readable storage medium of claim 15, wherein the low-level data comprises data structures, lists of executed mathematical operations, and at least one of derivatives-related data, calculus-related data, and optimization-related data.

18. The computer-readable storage medium of claim 15, wherein the codebase is related to supply chain management, one or more extensions are made to the auto-differentiation engine, and hooks are added to one or more points in the codebase.

19. The computer-readable storage medium of claim 15, wherein the low-level data comprises a directed acyclic graph.

20. The computer-readable storage medium of claim 19, wherein path-integrated gradients are used to compute the impact based on the directed acyclic graph.

* * * * *